(12) United States Patent
Cunningham

(10) Patent No.: US 7,043,770 B1
(45) Date of Patent: May 16, 2006

(54) PUNCTURE AND CUT RESISTANT SURGICAL GLOVE WITH MACROSPHERE CAPTURE DEVICES

(76) Inventor: Frank W. Cunningham, 4918 Elmdale, Rolling Hills Estates, CA (US) 90274

( * ) Notice: Subject to any disclaimer, the term of this patent is extended or adjusted under 35 U.S.C. 154(b) by 0 days.

(21) Appl. No.: 10/774,547

(22) Filed: Feb. 9, 2004

Related U.S. Application Data

(60) Provisional application No. 60/448,158, filed on Feb. 18, 2003.

(51) Int. Cl.
*A41D 19/015* (2006.01)
*B32B 25/04* (2006.01)

(52) U.S. Cl. .................. 2/161.7; 428/328; 428/329; 428/332; 428/408; 428/492; 428/522; 428/532; 428/689; 428/692; 428/911

(58) Field of Classification Search ............... 428/328, 428/329, 332, 408, 492, 522, 523, 689, 692, 428/911; 2/161.7
See application file for complete search history.

(56) References Cited

U.S. PATENT DOCUMENTS

| | | | | |
|---|---|---|---|---|
| 4,526,828 A | * | 7/1985 | Fogt et al. ..................... 442/19 |
| 4,742,578 A | * | 5/1988 | Seid ................................ 2/2.5 |
| 4,779,290 A | * | 10/1988 | Welch et al. ................. 2/161.6 |
| 4,833,733 A | * | 5/1989 | Welch et al. ................... 2/169 |
| 4,864,661 A | * | 9/1989 | Gimbel .......................... 2/167 |
| 5,070,540 A | * | 12/1991 | Bettcher et al. ................ 2/2.5 |
| 5,087,499 A | * | 2/1992 | Sullivan ....................... 428/85 |
| 5,187,815 A | * | 2/1993 | Stern et al. ...................... 2/16 |
| 5,200,263 A | * | 4/1993 | Gould et al. ................ 428/323 |
| 5,368,930 A | * | 11/1994 | Samples ..................... 428/323 |
| 5,601,895 A | * | 2/1997 | Cunningham .............. 428/66.6 |
| 5,817,433 A | * | 10/1998 | Darras ........................ 428/408 |
| 6,080,474 A | * | 6/2000 | Oakley et al. .............. 428/323 |
| 6,730,393 B1 | * | 5/2004 | Oakley et al. .............. 428/220 |

* cited by examiner

*Primary Examiner*—Samuel A. Acquah
(74) *Attorney, Agent, or Firm*—Lee W. Tower

(57) ABSTRACT

A puncture and cut resistant surgical glove is provided for protection against injury from sharp surgical instruments and needles. The puncture and cut resistant surgical glove includes overlaid arrays of adjacent substantially spherical macrospheres. Each macrosphere has capture devices for capturing the point of a sharp instrument. An elastomer encapsulates the overlaid arrays of adjacent macrospheres. Each macrosphere is either porous or formed of smaller microspheres that are aggregated together to provide capture devices. A polymer is coated over the aggregated microspheres to give each macrosphere a smooth surface. The polymer and microspheres provide a capture function for capturing the points of sharp instruments. The puncture and cut resistant surgical glove can be fabricated using low cost manufacturing methods.

28 Claims, 8 Drawing Sheets

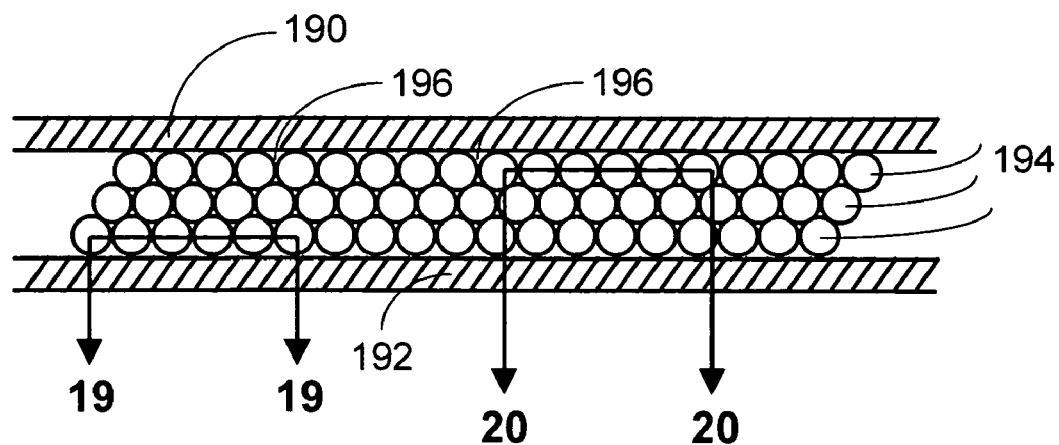
FIG. 18
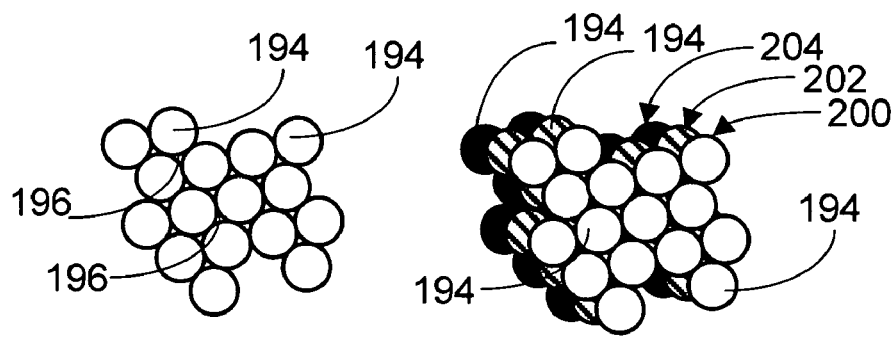
FIG. 19   FIG. 20

PUNCTURE AND CUT RESISTANT SURGICAL GLOVE WITH MACROSPHERE CAPTURE DEVICES

This application claims the benefit of Provisional Application No. 60/448,158, filed Feb. 18, 2003.

BACKGROUND OF THE INVENTION

1. Field of the Invention

This invention relates to a protective puncture and cut resistant material to protect against accidental injuries from needles, scalpel blades, knives and other sharp pointed instruments.

2. Description of the Related Art

Protection from accidental cuts and punctures is needed in the fields of medicine and law enforcement, and in any occupation where sharp instruments are encountered and where the combination of flexibility and protection against cuts and puncture wounds is needed.

Accidental needle sticks and scalpel blade cuts occur to doctors and nurses, while performing surgery, giving injections, taking blood samples, and administering intravenous liquids. The accidental needle sticks and scalpel blade cuts by themselves are harmful; however, in a medical situation a cut or puncture can also transmit infection either to the patient or to the medical person performing the procedure.

In the past, the main concern was that a surgeon would infect the patient during surgery. This is still a concern and is adequately addressed by using latex gloves. Because some people are allergic to the elastomer latex, there are various non-allergenic elastomers, such as Nitrile. Where the term latex or elastomer is used herein, the term is also meant to include various non-allergenic elastomers as well. Unfortunately, it is also increasingly crucial to protect surgeons and other medical personnel from infection. A surgeon can contract hepatitis, AIDS, and other diseases, when the blood or body fluid of a patient is transmitted through the skin of the surgeon. It is estimated that the average surgeon has about three cuts or puncture wounds per month, caused by either a hypodermic needle or a scalpel blade. This presents an unacceptable risk factor for surgeons and other medical personnel.

The CDC (Centers for Disease Control and Prevention) has estimated the number of percutaneous (through the skin) injuries per year in the United States. Each year there are 30 reported injuries per 100 occupied hospital beds. Since there are 600,000 occupied hospital beds in the United States, there are 180,000 reported percutaneous injuries reported per year. In addition the CDC estimates that 39% of the incidents are not reported according to the survey conducted. Also, the CDC doubles the resulting figure because 50% of healthcare workers are employed outside of hospital settings. The total estimated number of percutaneous injuries per year is 590,194.

The risks of infection following a single HIV (human immunodeficiency virus), HBV (hepatitis B virus), or HBC (hepatitis C virus) contaminated needlestick or sharp instrument injury are 0.3%, 6%–30%, and 1%–10%, respectively. Clearly surgeons and other health care workers are facing a high risk of infection from needlesticks and other sharp instruments.

Conventionally, surgeons and other medical personnel wear sterilized latex gloves, which are thin and flexible enough to enable a surgeon to freely manipulate his fingers, and to utilize his sense of touch. If the latex gloves are not penetrated then the patient and the surgeon are protected from infection; however, latex gloves offer hardly any protection against accidental punctures or cuts, because hypodermic needles and scalpel blades can easily puncture or cut through a latex glove. Even multiple layers of latex gloves, which medical personnel increasingly use to provide additional protection against transmission of infection, offer no protection against accidental punctures or cuts.

It is important to distinguish between cuts and puncture wounds. A cut is typically from the edge of a scalpel blade. A puncture wound can be caused by the point of a scalpel blade or by the point of a hypodermic needle. A scalpel blade is typically about 0.75 inches long with a sharpened edge and with a point about 0.001 inches in diameter. As the distance from the point increases the scalpel blade width increases. A hypodermic needle can be as small as 0.001 inches in diameter at the point, widening to about 0.010 inches half way up the bevel of the needle, and increasing to about 0.018 inches in diameter for the shaft of a No. 27 needle. It is much easier to protect against a cut from an edge of a scalpel blade than to protect against a puncture from either a scalpel blade or a hypodermic needle, because a scalpel blade has a wider surface upon which the pressure of the cut is distributed. For example, if the pressure is 2000 grams, then the pressure per square area for a scalpel blade is $2000/(0.75*0.001)$, assuming the edge of the scalpel blade is the same sharpness as the point of the scalpel blade (0.001 inches) and that the scalpel blade is 0.75 inches long. For a needle with a 0.001 diameter point, the same pressure would have a pressure per square area of $2000/(3.14*(0.001/2)^2)$, which is about nine hundred and fifty five times greater than the pressure per square area for the edge of a scalpel blade. This factor is a key reason that conventional protective gloves fail to offer adequate protection against punctures.

Most accidents in the operating room occur with some significant force. For example, a surgeon turns and is wounded accidentally by the point of a needle or scalpel being handed to him by a nurse or, a surgeon while suturing slips and punctures his hand with a needle. Effective protection against punctures should protect against pressures up to approximately 1500 to 1800 grams. This level of protection is well beyond the protection provided by the conventional puncture resistant gloves.

Conventional approaches to providing increased protection beyond latex gloves against cuts and punctures for a surgeon or other medical personnel include: providing a glove with a weave or knit of a material such as Kevlar, nylon, stainless steel or fiberglass; providing reinforced areas such as on glove fingers; placing foam material between two latex gloves; and providing leather on portions of the glove. Some of the materials, such as leather and Kevlar knits provide protection against cuts, but virtually no protection against punctures.

Conventional protective gloves having a simple weave or knit of a material such as Kevlar, nylon, stainless steel or fiberglass are characterized by U.S. Pat. Nos. 4,526,828, 5,070,540, 4,833,733, 5,087,499, 4,742,578, and 4,779,290. These approaches have fairly effective protection against cuts, because a material such as a Kevlar weave is hard to cut through. However, a shortcoming of all of these approaches is that the weave or knit is simply spread apart by the wedge on a needle or scalpel point to form a passage as the needle or scalpel point is inserted into the material. Making the weave tighter or thicker does not prevent punctures; moreover, a thicker or tighter weave significantly reduces the flexibility of these gloves and their usefulness. As the number of layers or the thickness of the material increases, the ability of a surgeon to freely manipulate his fingers, and to utilize his sense of touch is significantly reduced.

Conventional protective gloves providing reinforced areas are characterized by U.S. Pat. No. 4,865,661, which has woven fiberglass placed at certain areas on the fingers of a glove and U.S. Pat. No. 5,187,815, which has corrugated metal foil in areas to be reinforced. The shortcoming of these approaches is that the reinforced areas have little flexibility so can only be placed on certain areas, which leaves the rest of the glove without the same protection. Also, even woven fiberglass and corrugated metal may be punctured. The point of a #11 blade will easily pass through metal foil ½ to 1 mil thick.

The approach of placing foam material between two latex layers is the approach of U.S. Pat. No. 4,901,372, which provides little if any protection against cuts and punctures, because the latex and the foam can be easily cut and punctured.

Providing leather on a glove is an approach that provides some protection to cuts; however, little protection to punctures. Even though the pores of the leather may be smaller than the diameter of a needle, a needle will simply make a hole in the leather as it passes through.

A flexible puncture proof material in the prior art, which has capture devices, and therefore provides protection against both cuts and puncture wounds, is described in U.S. Pat. No. 5,601,895 issued to Frank W. Cunningham, M.D. on Feb. 11, 1997, and shown in FIGS. 1–3.

FIG. 1 is an elevation sectional view of the flexible puncture proof material 10 of U.S. Pat. No. 5,601,895. The flexible puncture proof material 10 has an flexible medium 22, which surrounds and attaches to capture devices, such as capture devices 24 and 26 within the flexible medium 22. The capture devices are attached in layers to the flexible medium and the number of layers depends on the type of material used for the capture devices. The flexible medium 22, which can be a flexible polymer such as silicone elastomer, binds the capture devices in the layers together and holds them in place. The flexible medium 22 provides a barrier against the transmission of water and infection through the material.

A base layer 40 can be provided, which can be fabricated of a woven material such as a steel mesh or a Kevlar weave. Alternately, base layer 40 can be made of fabric. The purpose of the base layer 40 is to provide a spacer if capture of a sharp instrument occurs in the deepest layer of the capture devices. For example, if only three layers of capture devices are used, and capture occurs in the third layer of capture devices, then the base layer 40 would prevent a point that slightly protrudes from a capture device from penetrating the entire puncture proof material. The base layer 40 also provides greater durability to the puncture proof material. The base layer 40 is purposely porous to allow the flexible medium 22 to permeate the base layer 40. The flexible medium extends to an elastomeric layer 14 on one side of the base layer 40.

The flexible puncture proof material 10, as illustrated in FIG. 1, provides first capture layer 16, second capture layer 18, and third capture layer 20. Each capture layer is comprised of a plurality of discs or plates, which have apertures. Each aperture in each plate or disc is large enough to accept and capture the pointed end of the sharp element and small enough to prevent the sharp element from passing through the aperture, which provides protection against punctures.

As shown in FIG. 1, disc 24 is in first capture layer 16, disc 26 is in second capture layer 18, and disc 28 is in third capture layer 20. Within each disc, apertures 30 are provided. FIG. 2 is a fragmentary plan view partially cut away along line 2—2 of FIG. 1 and shows how the disc layers overlay each other.

The layers are arranged relative to one another so that, although there are spaces 31 between discs in each layer, there is no vertical path of spaces through the layers. For example, FIG. 2 shows the triangular spaces 31 between the round discs on first capture layer 16, which are effectively closed or overlapped by discs on second capture layer 18. Any remaining voids in the first two capture layers are overlapped by discs on third capture layer 20.

The plates or discs of FIGS. 1 and 2 can be fabricated from stainless steel or some other hard material. The purpose of the apertures 30 in the discs is to capture the point of a sharp instrument, such as a hypodermic needle or a scalpel.

FIG. 3 is an elevation sectional view of the flexible material of FIG. 1 showing needle 50 attempting to puncture through the flexible material 10. As shown, the needle point 52 has been captured by aperture 42 on disc 24 in first capture layer 16. The diameter 46, as shown in FIG. 1, of aperture 42 is large enough to capture the needle point 52, but small enough so that the body of needle 50 cannot pass through flexible material 10. The needle diameter 54 is larger than aperture 42. As shown in FIG. 3 the needle point 52 is about to pierce through space 44 between disc 56 and disc 26 on second capture layer 18; however, the needle 50 has already been captured by aperture 42 so will be stopped from puncturing through the material.

FIG. 3 also shows scalpel 60, which has scalpel edge 62 and scalpel point 64, attempting to puncture through the flexible material 10 at space 34 in first capture layer 16. The scalpel will pass through space 34 but will then be captured by aperture 36 on disc 26 on the overlapping second capture layer 18. The diameter 46 of aperture 36 is small enough to capture the point of the scalpel, but small enough to not allow the scalpel to pass through flexible material 10. The diameter 46 of aperture 36 is about the width of scalpel blade dimension 68, but much smaller than the scalpel body width 66. The same principle applies to stopping a puncture from a needle.

The flexible puncture proof material of U.S. Pat. No. 5,601,895 provides a much more effective puncture proof material than many other prior art designs. However, a limitation is that a completed glove using the discs with capture element holes of the prior art described above is made by fabricating patterns of the material and then joining them together. A glove cannot be made using a single stage injection molding process or a dipping process as described below, because the use of a planar unit, as described in U.S. Pat. No. 5,601,895, in an injection molding process or a dipping process would result in random orientation of the planes of the capture unit discs. The outcome if injection molding or dipping were used would be defective stacking of the discs, which would result in areas with voids.

Gould U.S. Pat. No. 5,200,263 describes a composite material for puncture resistance made of steel platelets embedded in an overlapping pattern in an elastomer. A coating of material, such as epoxy, is added to minimize "skating". The resulting composite has a number of issues. First, planar platelets are relatively unstable to an impacting needle, even with an epoxy coating, and epoxy only increases the stiffness of the composite. Second, a needle at an oblique angle to the composite can readily spread the platelets. Third, a method described for dusting on the platelets lacks the precision and control to obtain a uniform, void-free coating, necessary to prevent injury. Many of these same concerns also apply to Gould U.S. Pat. No. 5,514,241, which describes a method of serial dipping into a suspension of platelets in elastomer. The resultant deposition and layering is random, and may produce excessive thickness or inadequate thickness of platelets. A further issue is that steel platelets, which have a specific gravity of about 9, and elastomer, which has a specific gravity of about 1.4, in a "suspension" would result in the platelets sinking, impairing uniformity of the suspension.

Samples U.S. Pat. No. 5,368,930 describes a composite material of an elastomer and non-elastomeric particles, such as metals, ceramics or crystalline minerals, especially those crystalline minerals having a plate-like nature. The described particles are very small, and would be unstable to needle impact, in large part due to their hardness, permitting tilting and deflecting of the needle point, and puncture. If the density of particles were increased to minimize this effect, there would be a proportionate increase in stiffness of the composite.

Darras U.S. Pat. Nos. 5,817,433 and 6,020,057 describe a composite made up of an elastomer with imbedded particles of very small size, 5 to 8 microns, of a very hard material, such as silicone carbide or diamond dust. The method of forming the composite is either by "dusting on" or by forming a mixture of elastomer and the particles. One or more layers of the composite can be interspersed with layers of plain elastomer. Such layering is increased depending on the puncture resistance desired. Again the hard particles would permit tilting and deflecting of the needle point, and puncture. By increasing the layers, the puncture resistance is increased, but there would be a proportionate increase in stiffness of the composite.

Thus, there is a need in the art for a puncture and cut resistant surgical glove that is flexible and protects against accidental puncture injuries from needles, scalpel blades and other sharp pointed instruments. It is desirable to form the surgical glove using low cost methods of fabrication.

SUMMARY OF THE INVENTION

It is an object of this invention to provide a puncture and cut resistant surgical glove that provides flexibility and elasticity and protects against dangerous puncture wounds from needles, scalpels and other sharp instruments and that can be fabricated using low cost methods.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 18 shows a cross section of the injection mold walls and the contained macrospheres in elastomer in accordance with the present invention.

FIG. 19 shows the hexagonal alignment of macrospheres in the injection mold along line 19—19 of FIG. 18 in accordance with the present invention.

FIG. 20 shows the hexagonal alignment of multiple layers macrospheres in the injection mold along line 20—20 of FIG. 18 in accordance with the present invention.

DETAILED DESCRIPTION

Figure 4:
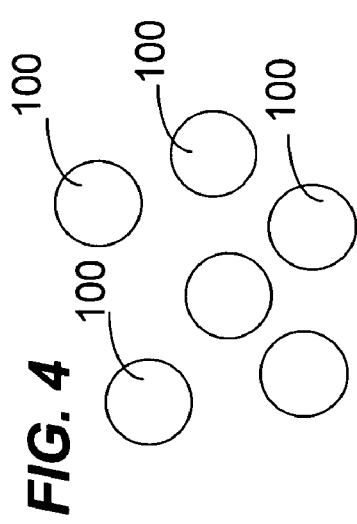
FIG. 4 shows a set of individual microspheres in accordance with the present invention.

Referring now to the drawings, FIG. 4 shows a set of individual microspheres 100. For the purposes of a surgical glove, each microsphere can be a ceramic (alumina) sphere with a diameter of 5 to 10 mils (125 to 250 microns). A microsphere can also be formed of many other materials and for other uses be smaller or larger. The key microsphere properties are that it should be substantially spherical and relatively hard so that a needle or other sharp instrument will not be able to puncture the microsphere.

Figure 1:
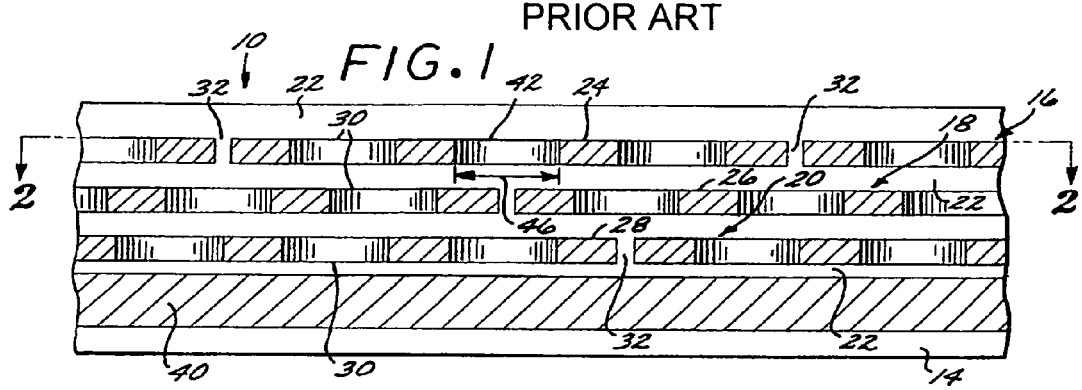
FIG. 1 is an elevation sectional view of a flexible puncture proof material in the prior art.
Figure 2:
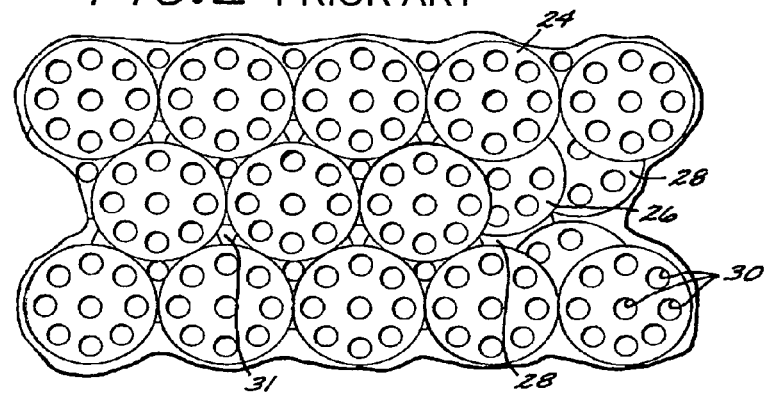
FIG. 2 is a fragmentary plan view partially cut away along line 2—2 of FIG. 1 showing discs with a plurality of apertures in accordance with the prior art.
Figure 3:
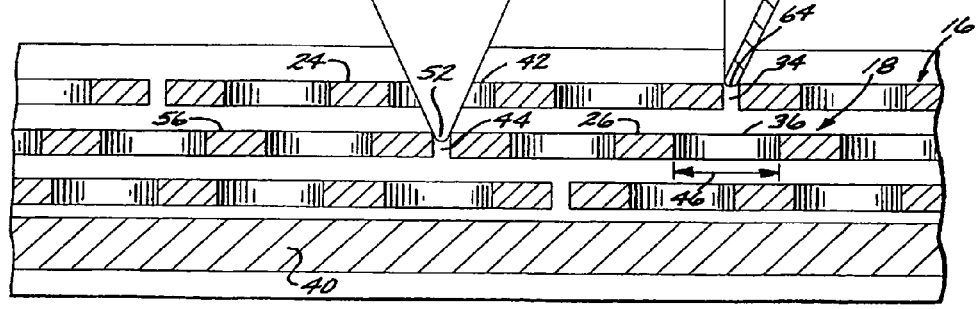
FIG. 3 is an elevation sectional view of the flexible material of FIG. 1 showing puncture prevention in accordance with the prior art.
Figure 5:
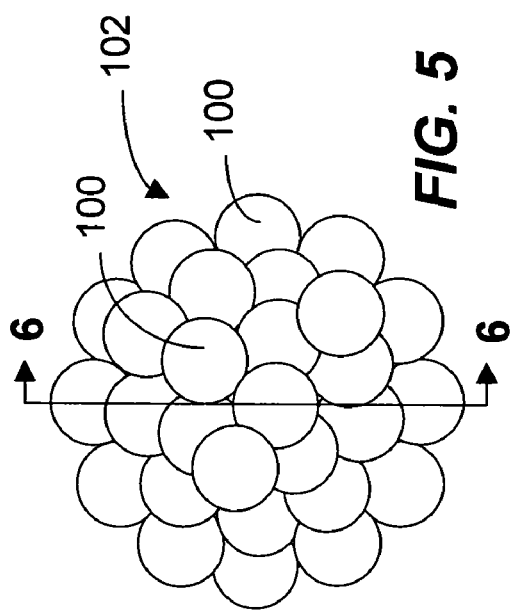
FIG. 5 shows a perspective view of a macrosphere in accordance with the present invention.
Figure 7:
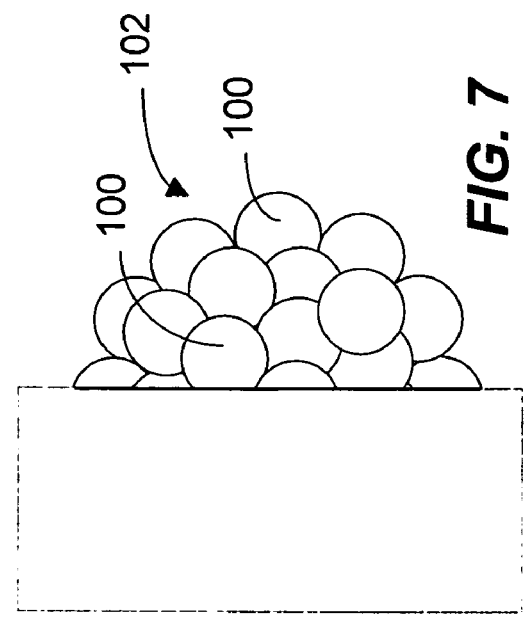
FIG. 7 is an elevational section of a macrosphere along line 7—7 of FIG. 6 showing a macrosphere sliced in half in accordance with the present invention.
Figure 6:
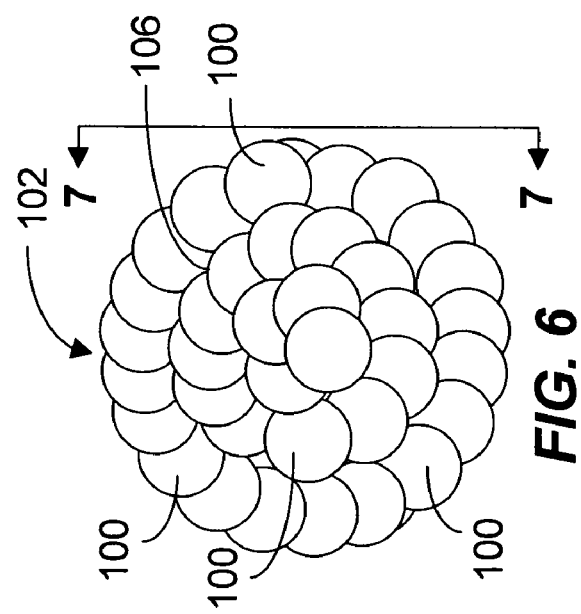
FIG. 6 shows an elevational section of the macrosphere of FIG. 5 along line 6—6 and illustrates a macrosphere formed of multiple microspheres bound together to form the macrosphere in accordance with the present invention.

The microspheres 100 are used to form macrospheres such as the macrosphere 102 shown in FIG. 5. A macrosphere used for a surgical glove would generally be about 20 to 60 mils in diameter (500–1500 microns), although for other purposes a macrosphere can be smaller or larger. FIG. 6 shows an elevational section of the macrosphere 102 of FIG. 5 along line 6—6 and illustrates a macrosphere formed of multiple microspheres 100 bound together to form the macrosphere. In this implementation, a macrosphere consists of multiple microspheres 100 aggregated together by a substance such as polyethylene 106, which would be in the interstices between the microspheres. FIG. 7 is an elevational section of a macrosphere along line 7—7 of FIG. 6 showing the macrosphere sliced in half, and showing that the face of FIG. 6 is flat.

Figure 8:
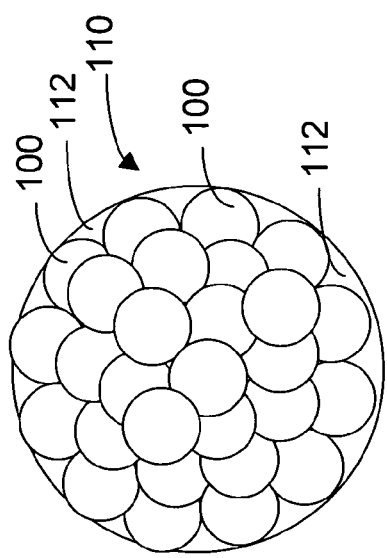
FIG. 8 is a perspective view of a macrosphere coated with polyethylene in accordance with the present invention.

Once the macrosphere is formed in the configuration of FIG. 5, it is necessary to make the macrosphere surface smooth and spherical so that optimum stacking of the macrosphere in an injection molding process will occur. This can be accomplished by forming a polyethylene coating over the surface of the macrosphere. As will be described below, for the macrosphere implementation of FIG. 5 the step of aggregating the microspheres to form the macrosphere and coating the macrosphere to make a smooth spherical surface can be performed simultaneously in one step. FIG. 8 is a perspective view of a macrosphere 110 coated with polyethylene 112. The result is a substantially spherical macrosphere.

Figure 9:
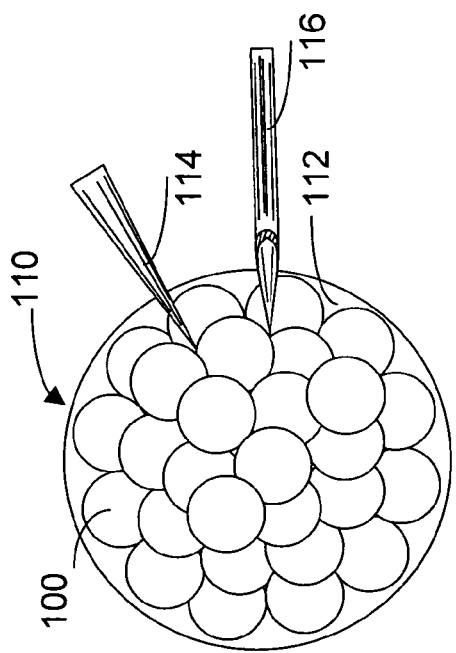
FIG. 9 is a perspective view of the macrosphere of FIG. 8 preventing puncture by capturing a sharp instrument and a surgical needle in accordance with the present invention.

FIG. 9 is a perspective view of the macrosphere 110 of FIG. 8 preventing puncture by capturing a sharp instrument 114 and a surgical needle 116.

Figure 10:
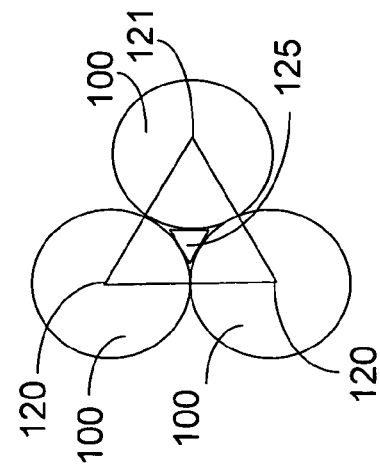
FIG. 10 shows one area of capture at the intersection of three adjacent microspheres in accordance with the present invention.

How a needle or sharp instrument is captured is important, because it is important to capture the needle or sharp instrument so that skidding does not occur and cause an injury to an unprotected surface. A sharp instrument 114 or needle point 116 can impact at any point on any macrosphere 110, and at any angle of incidence. The microspheres 100 are immobilized by being embedded in the polyethylene 112, which prevents separation of the microspheres 100. Each macrosphere 110 is surrounded by capture areas, one of which is shown in FIG. 10, which shows the triangular capture area or capture void defined by the vertices 120, 121, and 122 at the intersection of three adjacent microspheres 100 on the surface of a macrosphere. If 5 mil diameter microspheres are used to form the macrosphere, then the capture area defined by vertices 120, 121, and 122 is about 10.8 square mils. If 10 mil diameter microspheres are used to form the macrosphere, then the capture area defined by vertices 120, 121, and 122 is about 43.3 square mils. A hypodermic needle is about 0.001 inches in diameter at the point, widening to about 0.010 inches half way up the bevel of the needle, and increasing to about 0.018 inches in diameter for the shaft of a No. 27 needle. So a needle 116 impacting anywhere within the triangular capture area defined by vertices 120, 121, and 122 will be channeled into the capture void 125 between the microspheres. The capture void 125 has an area of about 1 squared mils for a macrosphere containing 5 mil microspheres, and has an area of about 4 squared mils for a macrosphere containing 10 mil microspheres. For either size microsphere the needle is captured. The polyethylene 112, which surrounds the macrosphere and is in the capture void, is soft enough to permit needle penetration and therefore capture of the needle. The larger 10 mil microsphere has some advantage, because there is more polyethylene between the microspheres on the surface of the macrosphere.

Figure 11:
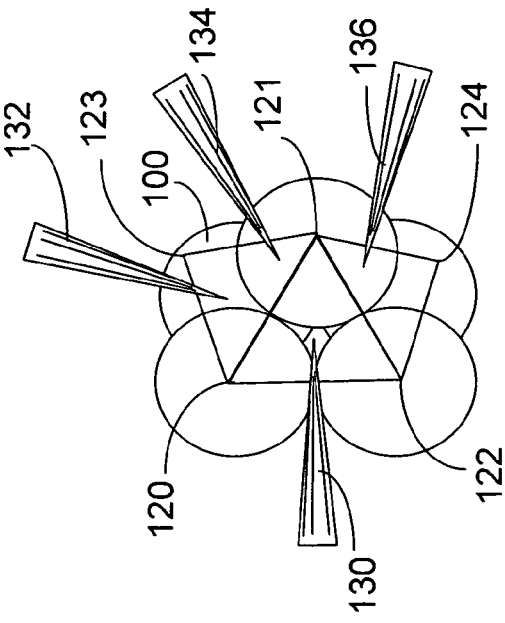
FIG. 11 shows adjacent areas of capture formed by adjacent microspheres and showing needles being captured in accordance with the present invention.

The macrosphere is surrounded by triangular capture areas and capture voids as shown in FIG. 11, which shows adjacent capture areas formed by adjacent microspheres and showing needles or other sharp instruments being captured. The capture area defined by the vertices 120, 121, and 122 captures needle 130. The capture area defined by the vertices 120, 121, and 123, which is directly adjacent and contiguous with the capture area defined by the vertices 120, 121, and 122, captures needles 132 and 134. The capture area defined by the vertices 121, 122, and 124, which is directly adjacent and contiguous with the capture area defined by the vertices 120, 121, and 122, captures needle 136. Because of the manner in which the microspheres surround the surface of the macrosphere, each macrosphere is surrounded by a contiguous set of capture areas, which perform the functions of capture devices. Each capture area has a capture void such as capture void 125 shown in FIG. 10.

One or another of two different methods, which produce an identical end result macrosphere, can accomplish fabrication of the macrospheres. Specifically, a 40 to 60 mil diameter macrosphere can be fabricated to be highly spherical and with a smooth, non-stick surface, with the microspheres imbedded in polyethylene.

Figure 12:
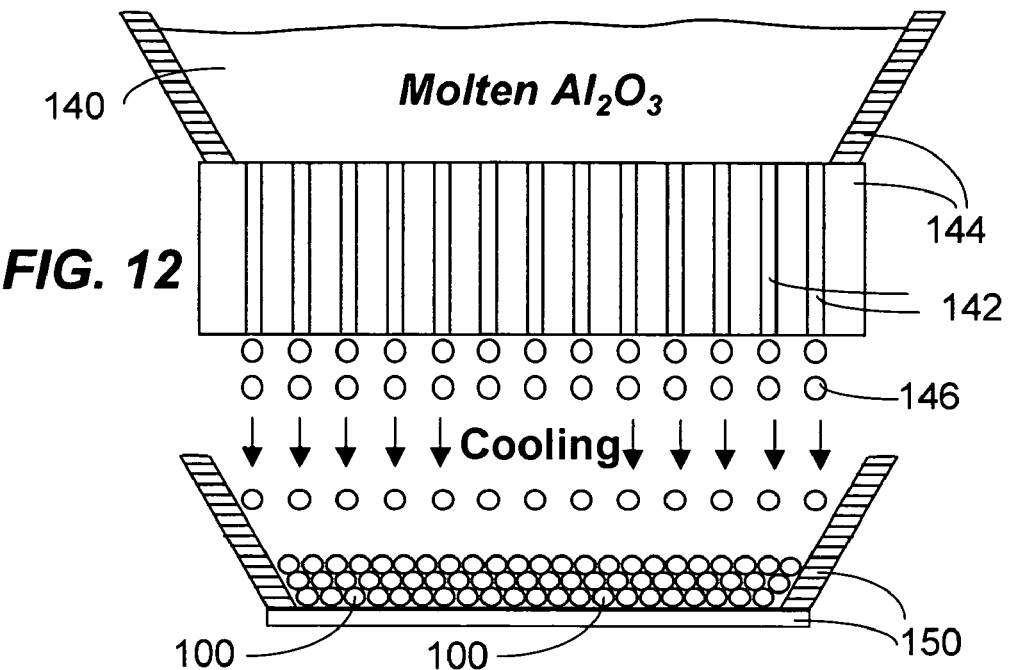
FIG. 12 shows a method of producing microspheres in accordance with the present invention.

The first method utilizes existing technology, as used by the company "Brace GmbH", which uses a machine (called a "Spherisator"). The Spherisator can produce microspheres of alumina at high temperature (2,000+F), but can also "encapsulate" material at lower temperatures (400 to 500 degrees F. FIG. 12 shows a method of producing microspheres using a machine such as the Spherisator. A molten solution of alumina ($Al_2O_3$) is forced by pressure through channels 142 in a nozzle 144. The molten alumina exits the nozzle as a fine spray of droplets 146 of alumina, which when cooled become spherical due to the surface tension of the droplet. By proper controlling the cooling and collection of the droplets, microspheres 100 are formed and collected in bin 150.

Figure 13:
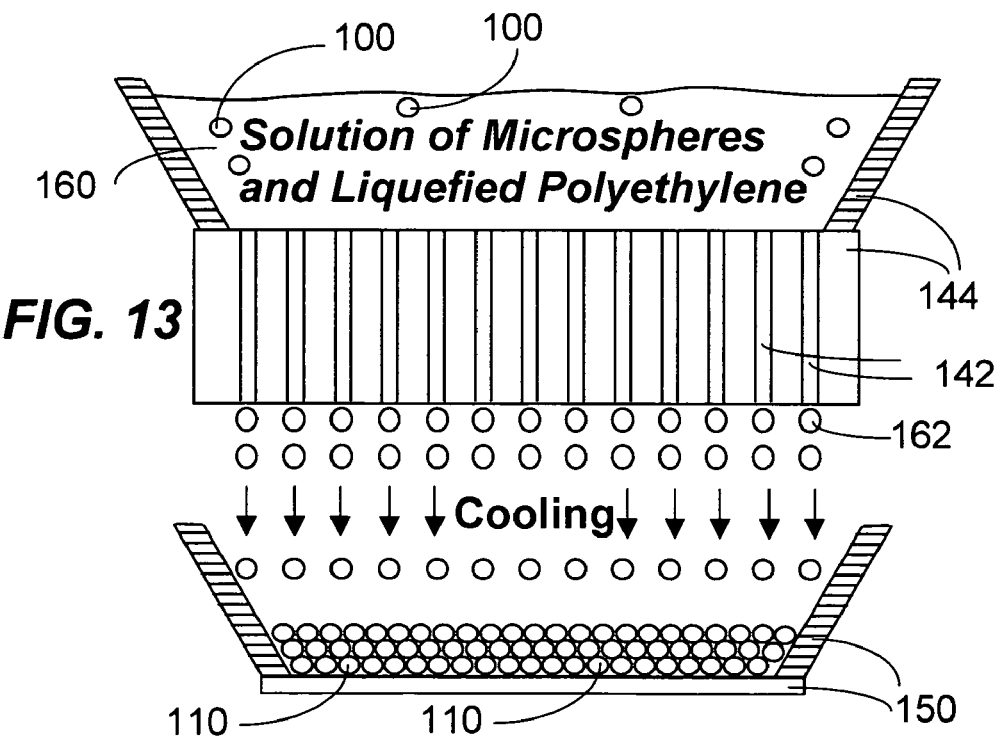
FIG. 13 shows a method of producing macrospheres in accordance with the present invention.

A similar method can be used to produce the macrospheres as shown in FIG. 13. A mix of a selected microsphere is blended with polyethylene pellets, and flows through the machine, subjected to heat, which liquefies the polyethylene making the solution 160. Pressure forces the solution 160 through the channels 142 in the nozzle 144. Droplets so formed then are in a free fall, and take on the spherical form due to surface tension. Droplets 162 exiting the nozzle contain microspheres in a solution of polyethylene. Cold air then solidifies the spheres. As the drops cool the microsphere coalesce together in a sphere and are bound by the polyethylene, forming macrospheres. The polyethylene also coats the surface of the macrosphere and surface tension results in the macrospheres being spherical with a smooth surface. The formed macrospheres 110 are collected in bin 150.

Another method for forming macrospheres is micro injection molding. Standard methods of preparation of the materials for this composite would be used, with a blend of the selected alumina microspheres and polyethylene. The mold would be bi-valved in form, consisting of two hemispheres. Due to the small size of the macrospheres, a die could have about 10,000 cavities, in an area of about one square foot, and produce that number of macrospheres with each cycle of the machine. The usual branching "tree" (inflow conduit for the composite), would permit easy removal, and the macrospheres would be extracted by mechanical means, such as fracturing and screening. Tumbling and polishing would remove any "flash" from the spheres.

The use of high density polyethylene was selected for the macrospheres as it serves several specific functions. First, it provides rigid and strong bonding of the microspheres; second, it converts the otherwise "bumpy" outer/surface layer of the microspheres to a smooth surface; third, it is soft enough to permit the needle point to enter the triangular capture area between adjacent microspheres; and fourth, it has the non-stick property required for the formation of the glove. The last property relates to the contact of the macrospheres with an elastomer used in forming a surgical glove by injection molding, which is further explained below in reference to FIG. 18. The choice of Nylon or Teflon could provide similar properties, in varying degrees.

An alternate method of forming macrosphere is to sinter or fuse the microspheres in the Spherisator, to form the Macrosphere, was considered. However, this was found not to be desirable, since fusing the microspheres produces significant deformation of the spherical shape of the microspheres, which compromises the capture function of the macrosphere. This method could be effective however with much larger microspheres.

Figure 14:
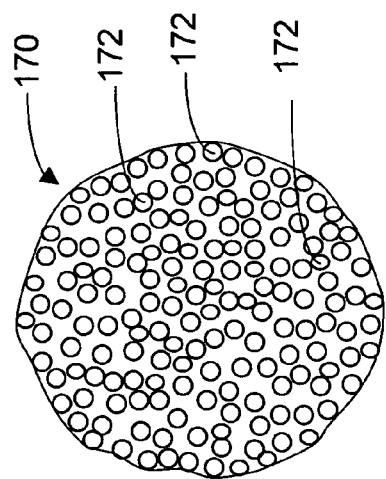
FIG. 14 shows a macrosphere formed of porous material in accordance with the present invention.
Figure 15:
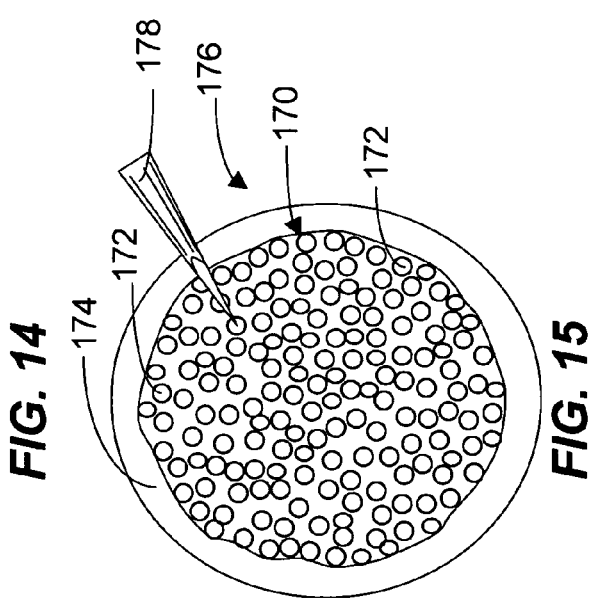
FIG. 15 shows the macrosphere formed of porous material of FIG. 15 coated with polyethylene and capturing a needle in accordance with the present invention.

Another type of macrosphere is a porous macrosphere, which is not formed of microspheres. This macrosphere design differs structurally from the macrosphere having microspheres, but retains the capture property to a similar, but somewhat less effective, degree. This type of macrosphere is more easily made by a machine such as the Spherisator, and can be made in larger sizes than the type of macrospheres with microspheres. A porous macrosphere can be made to be more than 60 mils in diameter. FIG. 14 shows a porous macrosphere 170 having many pores 172. The porous macrosphere 170 is coated with polyethylene 174, as shown in FIG. 15 to give the finished porous macrosphere 176 a smooth spherical surface. A sharp instrument or needle 178 is captured when the polyethylene yields to the needle point on contact. Lateral translation, skidding, or "skiving" is prevented as the needle point contacts the porous surface in a random pore, which stops the motion of the needle, and further stabilizes it from lateral translation.

Figure 16:
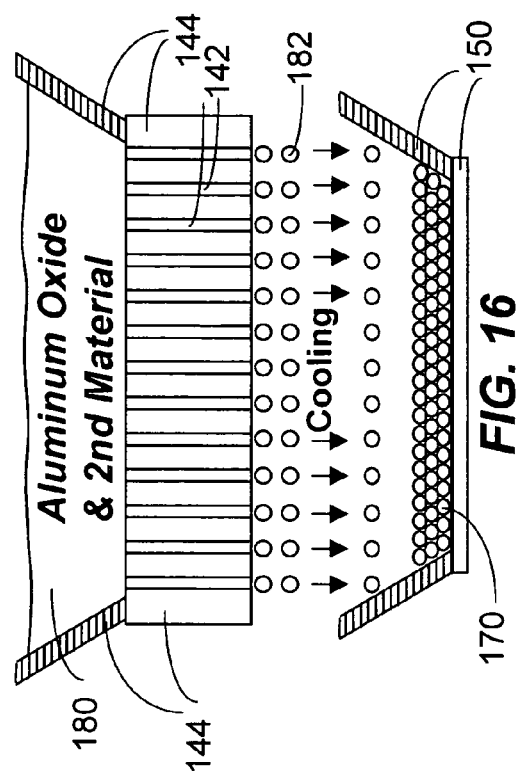
FIG. 16 shows a method of producing macrospheres formed of porous material in accordance with the present invention.

FIG. 16 shows a method of producing microspheres using a machine such as the Spherisator. A molten solution 180 of aluminum oxide ($Al_2O_3$) and a second material which volatizes at a lower temperature than the alumina is forced by pressure through channels 142 in nozzle 144. When the droplets 182 containing the aluminum oxide and the second material exit the nozzle, then while the aluminum oxide cools, the second material, which is no longer at pressure, volatizes creating in the process pores of 5 to 20 mils on the surface of the macrospheres 170 collected in bin 150. In a finishing step, the large porous macrospheres are tumbled with an abrasive to better open up the surface, and remove any intact surface film of alumina.

Figure 17:
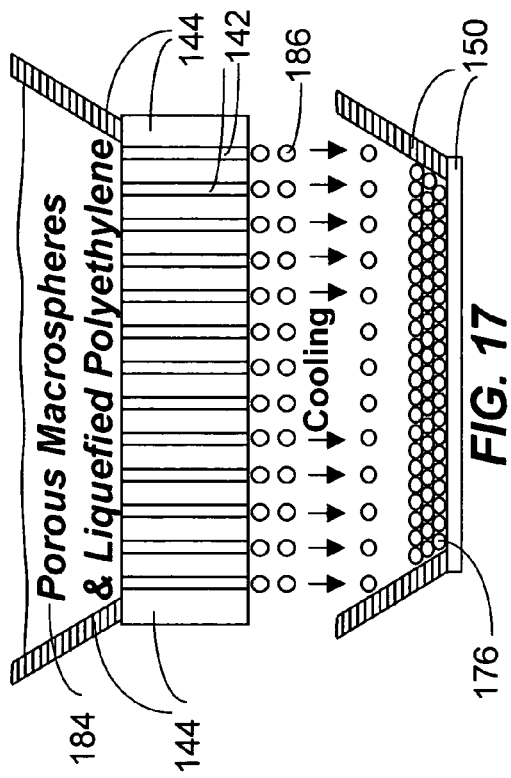
FIG. 17 shows a method of producing coated macrospheres of porous material in accordance with the present invention.

Then in a second pass through the Spherisator, a coating of polyethylene, about 10 mil thick is applied at a lower temperature, about 400 to 500 degrees F. This gives the porous macrosphere 176 its final form, with a smooth, spherical surface. This process is illustrated in FIG. 17 showing the porous macrospheres and liquefied polyethylene 184 being forced at pressure through the channels 142 in the nozzle 144. As the droplets 186 fall they take on a spherical form due to surface tension. The formed and coated porous macrospheres 176 are collected in bin 150.

Now the fabrication of a glove from the macrospheres is described with reference to FIGS. 18–25.

In one method the glove is formed with an injection molding process, modified to suit the nature of the desired composite material. FIG. 18 shows a cross section of the injection mold walls (inner 190 and outer 192), and the contained composite of macrospheres 194, in a matrix of elastomer polymer 196. The elastic polymer holds and stabilizes the macrospheres in the glove shape. A suitable elastomer has a catalyst so that it will cure rapidly with heat. It should be of a low, meaning soft, durometer. It should be noted that the total mass of this elastomer would be minimal, and would be a net-like structure, which would enhance flexibility. In addition, the spherical shape and the non-stick surface of the macrospheres 194 allows a sliding motion to occur at the sphere-elastomer interface, further enhancing flexibility. Tactile transmission, which is very important to a surgeon, would be enhanced for the same reasons. Any needle impact would be captured, either on contact with the top layer of macrospheres 194 by being captured by the macrosphere itself, as described above, or if the needle entered a void between macrospheres 194, such as the void 197, then the needle will be captured by the middle or bottom layer of macrospheres. Hence, lateral displacement of the macrospheres is not likely.

Hexagonal versus cubic packing of the macrospheres would occur, because the macrospheres 194 are confined only in the vertical axis on FIG. 18 between inner mold wall 190 and outer mold wall 192, but are allowed to extend in the horizontal axis. A characteristic of the hexagonal packing is a reduction in aggregate thickness. Specifically, in the case of three layers of macrospheres, if the macrospheres are one millimeter (40 mils) in diameter where the macrospheres are made from 10 mil diameter microspheres, then the total thickness of the glove is not three millimeters, but only 0.8×3=2.4 millimeters (96 mils). This has been verified in a test model. Further reduction in total glove thickness is possible if 5 mil diameter microspheres are used. In this case the macrospheres have a diameter of 0.5 millimeters (20 mils). With a three layer hexagonally packed macrosphere glove wall, the total thickness dimension of the glove would be only 0.8×0.5×3= 1.2 millimeters thick (48 mils). A thinner puncture resistant surgical glove greatly improves flexibility and elasticity, while protecting against dangerous puncture wounds from needles, scalpels and other sharp instruments.

The resulting material formed using the layers of macrospheres is also highly cut resistant. The alumina in the macrospheres is so hard that any slash by a scalpel blade would immediately take the "edge" off of the blade, and prevent cutting. In addition to the puncture and cut resistance, a surgical glove formed using the material has the additional property of being impermeable to fluids or blood, and thereby maintains the sterility of the surgical field.

FIG. 19 shows the hexagonal alignment of macrospheres 196 in the injection mold along line 19—19 of FIG. 18. Elastomer 196 is between the macrospheres. FIG. 20 shows the hexagonal alignment of multiple layers macrospheres in the injection mold along line 20—20 of FIG. 18. Three layers 200, 202, and 204 of the macrospheres 194, aligned hexagonally and stacked hexagonally, provide complete void-free coverage of the entire surface. To distinguish the layers in FIG. 20, the macrospheres 194 in layer 200 are shown as white, the macrospheres 194 in layer 202 are shown as crosshatched, and the macrospheres 194 in layer 204 are shown as black, although all of the macrospheres 194 are essentially identical.

To fabricate a glove or other gear, an injection molding process can be used; however, unlike the typical injection molding process, where a thermoplastic polymer flows into a mold, this composite, which includes macrospheres, has special requirements. The principle challenge is to obtain solid packing of the macrospheres in the mold. The usual formation of a composite of polymer plus nano sized particles, allows blending of the two components before molding, then the mix in a liquid state can be poured or flowed freely into the mold. However, with micro versus nano particles, a different method is required.

Figure 21:
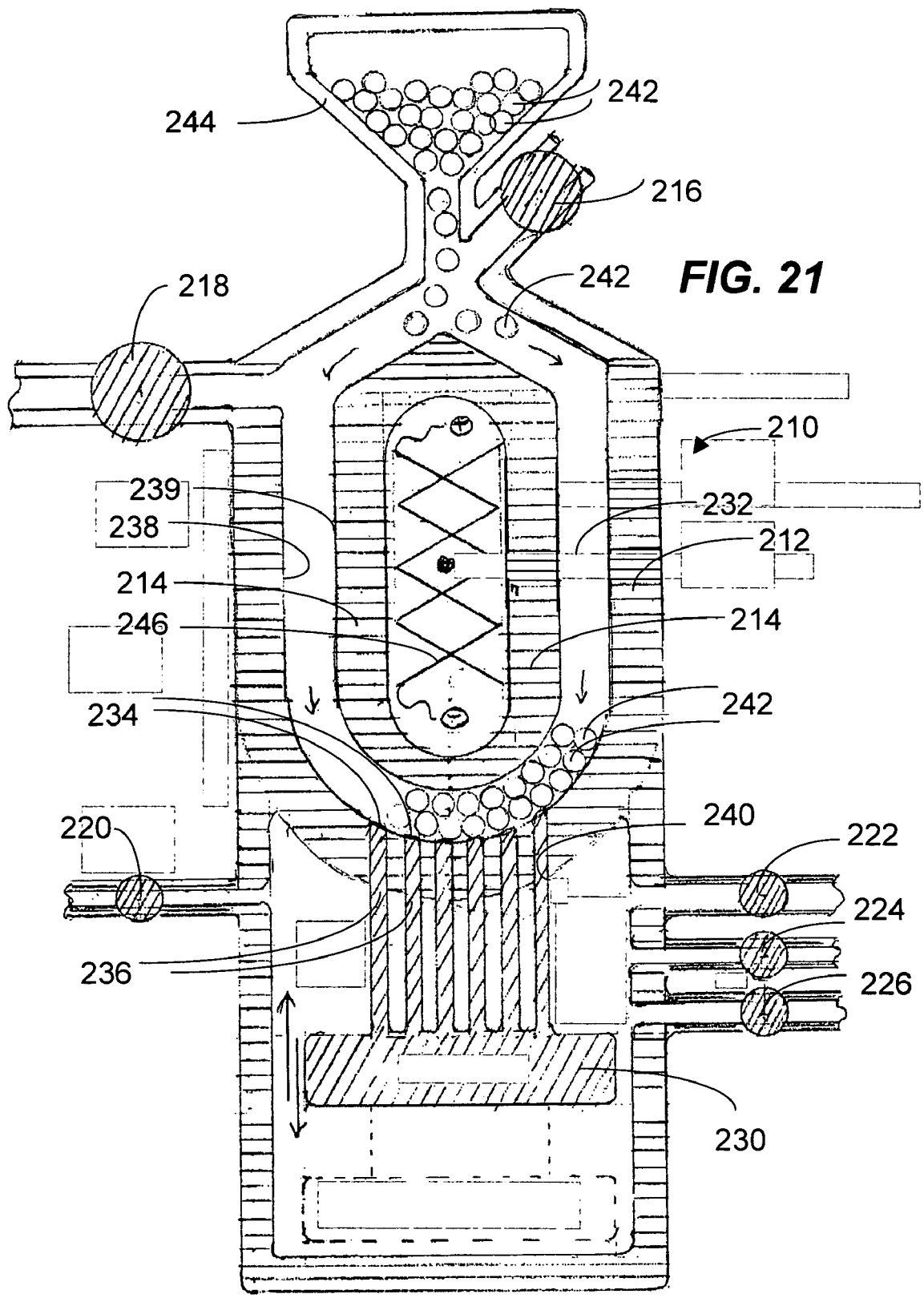
FIG. 21 is an injection mold showing a single digit of a full hand mold for forming a puncture and cut resistant surgical glove using an injection molding process in accordance with the present invention.

FIG. 21 shows a portion of a full hand mold. The scale is non-uniform, and is presented to illuminate the method of producing a glove. The same method can be adapted to other shapes and purposes. The generally cylindrical shape represents a single digit of the full hand mold. The mold 210 is a bi-valve type of mold, with the outer wall 212, forming the female side, and the inner wall 214, forming the male side. Each of the crosshatched circles 216, 218, 220, 222, 224, and 226 is an electrically operated fluid valve, linked to a computer program which allows each to be individually set in the "open" or "closed" position, depending on the sequential step of the process. There is a "multipronged" gate valve 230 at the tip of each digit, which is powered by a servomotor and computer controlled. The purpose of the "multipronged" gate valve 230 is to allow air or fluid to exit the mold cavity 232. The tips 234 of the prongs 236 of the gate valve 230 have a precision contour, to match the outer surface of the glove fingertip, which is formed on the inner surface 238 of the female mold 212. Also, the diameter of the holes 240 for the valve prongs 236 in the outer mold 212 must be smaller than the diameter of the macrospheres 242, to retain them in the mold cavity 232. An alternate design for the gate valve 230 could utilize flat or blade-like prongs, to provide slits, which may give more rapid flow. Without the gate valve 230, the injection molded glove could not be removed from the mold at the end of the process.

The macrospheres 242 flow in from a hopper 244 at the top. The compressed air jet enters at an angle via valve 216, to propel the macrospheres 242 into the mold. Air is used as a transport method, to allow uniform packing of the macrospheres in the mold from bottom to top. If the spheres were first simply mixed with the elastomer, the viscosity of the polymer would impede the uniform packing of the macrospheres into the mold.

In the center of the male mold 214, is an electric heater element 246 to heat the polymer, which enters the mold when valve 218 is opened. Alternately, it is possible that a thermoplastic elastomer, instead of a thermosetting elastomer, could be used if it had optimal properties of durometer and elasticity after setting. The inner surfaces 238 and 239 of the mold 210 would, optimally, have a Teflon coating to facilitate removal of the formed glove.

The process, which can be automated, is as follows.
Step One.
Multipronged gate valve 230 opened.
Hopper 244 filled with macrospheres 242.
Air vent outflow valve 224 opened.
Compressed air flow valve 216 opened.
Flow of macrospheres continues until mold is filled.
Step Two.
Gate valve 230 opened.
Air vent outflow valve 224 closed.
Polymer outflow valve 222 opened to recirculate the excess polymer to a polymer reservoir (not shown) and to purge any bubbles.
Polymer inflow valve 218 opened and fluid polymer inserted under pulsed pressure.
Step Three
Gate valve 230 closed.
Flush solvent valve 226 opened.
Flush solvent inflow valve 220 opened. The solvent prevents any residual polymer from curing in the gate valve chamber, and blocking flow. The solvent could be distilled and re-used by the machine.
Step Four.
All valves closed.
Heating element 246 turned on to thermally cure the polymer.
Step Five.
Bi-valve outer mold opened.
Air flow to the space between the glove and the male mold to facilitate removal of the glove from the mold.

The above stepwise process is intended as a general outline, and no attempt is made to elaborate on the numerous other injection molding equipment and design factors that would be required for this process and the many other detailed implementations of injection molding that are possible.

While the method of glove fabrication by injection molding is very precise and controlled, a second method would have the advantage of lower cost of tooling, and a less expensive product. The standard method of making elastomer surgical gloves is very simple. A (porcelain) hand shape (a "former") is simply immersed in the liquid elastomer, which can be latex or a non-allergenic elastomer, such as Nitrile, and then allowed to dry. This method can also be used with a suspension of macrospheres; however, some modifications are required.

Microspheres can be formed with the method shown in FIG. 12; however, micron-sized particles of elemental iron, or a magnetic sensitive compound or mineral of iron, such as iron pyrite, is added to the molten alumina 140. This addition gives the microspheres 100 a property of magnetic sensitivity. The resultant macrospheres formed in FIG. 13 are thereby also magnetically sensitive. Porous macrospheres, as shown in FIG. 15, can also be made magnetically sensitive by adding a magnetically sensitive mineral to the solution 180 in FIG. 16.

Figure 22:
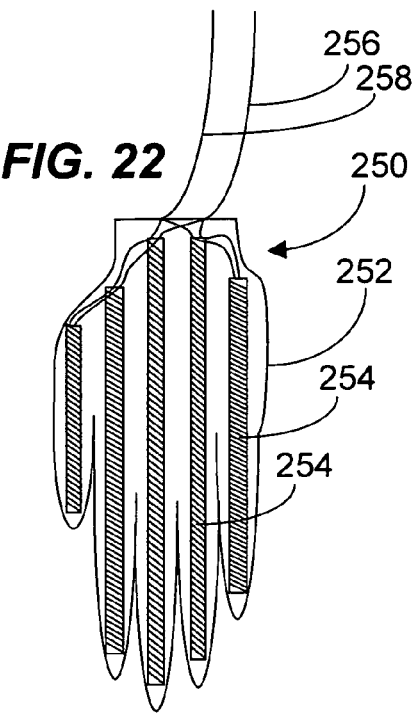
FIG. 22 is a former with electromagnetic elements in accordance with the present invention.

A special former 250, as shown in FIG. 22, has the usual outside hand shape 252; however, internally the former 250 has electromagnetic elements 254, which can be activated and deactivated via wires 256 and 258. The electromagnetic elements 254 can be implemented in a number of ways, but the most straightforward is a set of coils 254. When current flows via wires 256 and 258 through the coils, the coils generate a magnetic field. A finely tunable circuit can be used to attain a precise level in the intensity of the magnetic field at the surface 252 of the former 250. The surface 252 of the former 250 is not magnetic and can be made of porcelain or other non-magnetic material.

Figure 23:
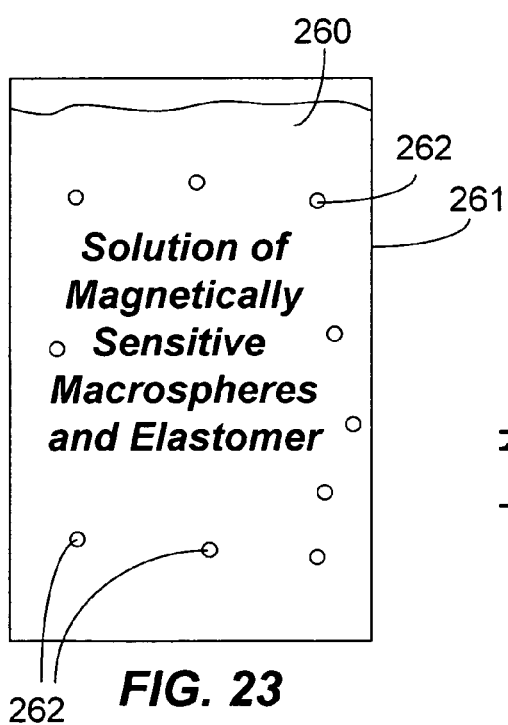
FIG. 23 is a bath of magnetically sensitive macrospheres and elastomer in accordance with the present invention.

A bath 261, shown in FIG. 23, contains a solution 260 of low viscosity elastomer, such as latex or Nitrile, and magnetically sensitive macrospheres 262. The specific gravity of the macrospheres can be adjusted by varying the thickness of the polyethylene on the macrospheres to make the macrosphere specific gravity closer to that of the elastomer in order to maintain the macrospheres in suspension. Other techniques can also be used including stirring of the solution 260.

Figure 24:
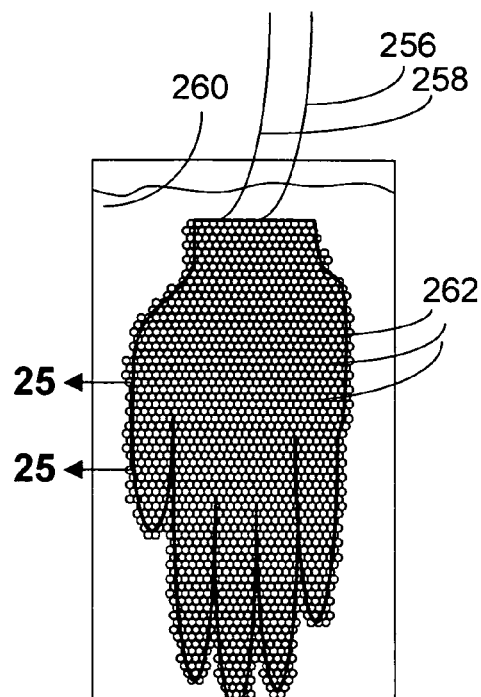
FIG. 24 shows the former with electromagnetic elements dipped in a bath of magnetically sensitive macrospheres and elastomer in accordance with the present invention.
Figure 25:
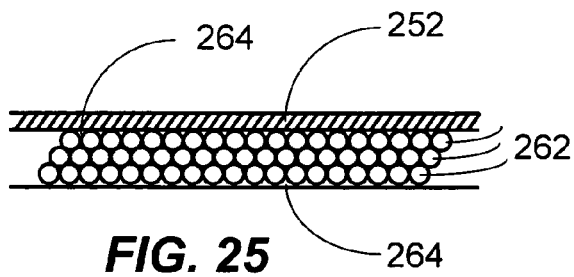
FIG. 25 shows a sectional view along line 25—25 of FIG. 24 in accordance with the present invention.

The former 250 is immersed in the suspension, as shown in FIG. 24. When the magnetic field is activated via wires 256 and 258, the magnetically sensitive macrospheres 262 are drawn to the former 250. The intensity of the magnetic field is adjusted to achieve an approximately three layer deposition of the macrospheres 262 with hexagonal packing. FIG. 25 is a sectional view along line 25—25 of FIG. 24 and shows the macrospheres 262 in hexagonal packing along the surface 252 of the former. Also shown is the elastomer 264, such as latex or Nitrile, which surrounds the macrospheres.

It is important to note that if a different geometric shape than the macrosphere is used, such as a disc, the discs would tend to stack upon each other, with their plane either horizontally, or vertically to the surface, or in a random array with voids, thereby offering none or inconsistent puncture resistance. If a simple sphere without a capture mechanism were used, the needle would simply pass between the spheres, or simply rotate the sphere, then be deflected, without preventing puncture.

The foregoing provides a puncture and cut resistant surgical glove that provides flexibility and elasticity and protects against dangerous puncture wounds from needles, scalpels and other sharp instruments. Other puncture and cut resistant materials for other applications can be made using these concepts and are within the scope of this invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope of the present invention and additional fields in which the present invention would be of significant utility.

It is therefore intended by the appended claims to cover any and all such applications, modifications and embodiments within the scope of the present invention.

What is claimed is:

1. A puncture and cut resistant material comprising:
a plurality of substantially spherical macrospheres;
wherein each macrosphere comprises:
    a plurality of substantially spherical microspheres aggregated together in a substantially spherical shape; and
    a polymer binding together the plurality of microspheres;
wherein the polymer is in interstices between the microspheres and surrounds the aggregated plurality of microspheres to form the substantially spherical macrosphere.

2. The puncture and cut resistant material of claim 1 wherein each macrosphere further comprises:
a plurality of capture devices;
wherein each capture device comprises an area of polymer in the interstices between adjacent aggregated microspheres in the macrosphere;
wherein the plurality of aggregated microspheres in the macrosphere and the polymer aggregating the microspheres to form the macrosphere create a plurality of capture devices surrounding the macrosphere; and
wherein each capture device is adapted to capture a point of an invading sharp instrument.

3. The puncture and cut resistant material of claim 1 wherein:
the microspheres comprise alumina.

4. The puncture and cut resistant material of claim 1 wherein:
the microspheres comprise a magnetically sensitive material.

5. The puncture and cut resistant material of claim 1 wherein:
each microsphere has a diameter of approximately 5 to 10 mils; and
each macrosphere has a diameter of approximately 20 to 60 mils.

6. The puncture and cut resistant material of claim 1 wherein:
the polymer comprises high density polyethylene.

7. The puncture and cut resistant material of claim 1 further comprising:
a first array of adjacent macrospheres; and
an elastomer encapsulating the first array of adjacent macrospheres.

8. The puncture and cut resistant material of claim 7 further comprising:
a second array of adjacent macrospheres overlaying and stacked on the first array; and
a third array of adjacent macrospheres overlaying and stacked on the second array;
wherein the elastomer encapsulates the first, second, and third stacked arrays of adjacent macrospheres.

9. The puncture and cut resistant material of claim 8 wherein the elastomer encapsulated first, second, and third stacked arrays of adjacent macrospheres form a puncture resistant surgical glove.

10. A puncture and cut resistant material comprising:
a plurality of substantially spherical porous macrospheres;
wherein each macrosphere comprises:
    a substantially spherical porous structure comprising a plurality of random pores on the surface of said porous structure; and
    a polymer coating over the porous structure;
wherein the polymer coating over the porous structure coats said random pores forming a substantially spherical macrosphere having a substantially smooth surface.

11. The puncture and cut resistant material of claim 10 further comprising for each of the plurality of substantially spherical porous macrospheres:
a plurality of capture devices;
wherein each capture device comprises:
    one of the plurality of random pores and the polymer coating over the random pore;
wherein each capture device is adapted to capture a point of an invading sharp instrument.

12. The puncture and cut resistant material of claim 10 wherein:
the substantially spherical porous macrospheres comprise porous aluminum oxide.

13. The puncture and cut resistant material of claim 10 wherein:
the substantially spherical porous macrospheres comprise a magnetically sensitive material.

14. The puncture and cut resistant material of claim 10 wherein:
each substantially spherical porous macrosphere has a diameter of approximately 60 to 120 mils.

15. The puncture and cut resistant material of claim 10 wherein:
the polymer comprises high density polyethylene.

16. The puncture and cut resistant material of claim 10 further comprising:
a first array of adjacent substantially spherical porous macrospheres;
a second array of adjacent substantially spherical porous macrospheres overlaying and stacked on the first array;
a third array of adjacent substantially spherical porous macrospheres overlaying and stacked on the second array; and
an elastomer encapsulating the first, second, and third stacked arrays of adjacent substantially spherical porous macrospheres.

17. A puncture and cut resistant surgical glove comprising:
   a plurality of overlaying and stacked arrays of adjacent substantially spherical macrospheres, each macrosphere having a plurality of capture devices, each capture device adapted to capture a point of an invading sharp instrument; and
   an elastomer encapsulating the plurality of overlaying and stacked arrays of adjacent macrospheres;
   wherein each substantially spherical macrosphere having a plurality of capture devices comprises:
      a plurality of substantially spherical microspheres aggregated together in a substantially spherical shape; and
      a polymer binding together the plurality of microspheres;
      wherein the polymer is in interstices between the microspheres and surrounds the aggregated plurality of microspheres to form the substantially spherical macrosphere;
   wherein each capture device comprises an area of polymer in the interstices between adjacent aggregated microspheres in the macrosphere; and
   wherein the plurality of aggregated microspheres and surrounding polymer surround the macrosphere with the plurality of capture devices.

18. The puncture and cut resistant surgical glove of claim 17 wherein:
   each macrosphere has a diameter of approximately 20 to 60 mils.

19. The puncture and cut resistant surgical glove of claim 17 wherein:
   each macrosphere comprises a magnetically sensitive material.

20. A method for producing a puncture and cut resistant material comprising the steps of:
   spraying droplets of molten alumina;
   cooling the droplets to form substantially spherical microspheres;
   spraying droplets of a solution of microspheres and liquefied polyethylene; and
   cooling the droplets to form macrospheres, each macrosphere comprising microspheres aggregated together in a substantially spherical shape and bound together and coated with polyethylene.

21. A method for producing a puncture and cut resistant material comprising the steps of:
   spraying droplets of molten alumina and a second material that volatizes at a lower temperature than the alumina;
   cooling the droplets to form porous substantially spherical macrospheres;
   tumbling the porous macrospheres with an abrasive to open up the surface and remove any intact surface film of alumina;
   spraying droplets of a solution of porous macrospheres and liquefied polyethylene; and
   cooling the droplets to form polyethylene coated porous macrospheres;
   wherein when the second material volatizes at the lower temperature, bubbles are formed in the droplets forming the porous macrospheres.

22. The puncture and cut resistant material of claim 16 wherein the elastomer encapsulated first, second, and third stacked arrays of adjacent macrospheres form a puncture resistant surgical glove.

23. The method of claim 20 further comprising the step of injecting the macrospheres and an elastomer into an injection mold.

24. The method of claim 20 wherein the step of spraying droplets of molten alumina further comprises the step of spraying droplets of molten alumina comprising a magnetically sensitive material;
   wherein the formed macrospheres are magnetically sensitive.

25. The method of claim 24 further comprising the steps of:
   dipping a former comprising electro-magnetic elements into a solution of the magnetically sensitive macrospheres and an elastomer; and
   activating the electro-magnetic elements;
   whereby activating the electromagnetic elements draws the magnetically sensitive macrospheres onto surfaces of the former.

26. The method of claim 21 further comprising the step of injecting the porous macrospheres and an elastomer into an injection mold.

27. The method of claim 21 wherein the step of spraying droplets of molten alumina and a second material that volatizes at a lower temperature than the alumina further comprises the step of spraying droplets of molten alumina comprising a magnetically sensitive material and a second material that volatizes at a lower temperature than the alumina wherein the formed porous macrospheres are magnetically sensitive.

28. The method of claim 27 further comprising the steps of:
   dipping a former comprising electro-magnetic elements into a solution of the magnetically sensitive porous macrospheres and an elastomer; and
   activating the electromagnetic elements;
   whereby activating the electro-magnetic elements draws the magnetically sensitive porous macrospheres onto surfaces of the former.

* * * * *